Feb. 27, 1934.    W. LISSY    1,948,823
FISH LURE
Filed May 18, 1931
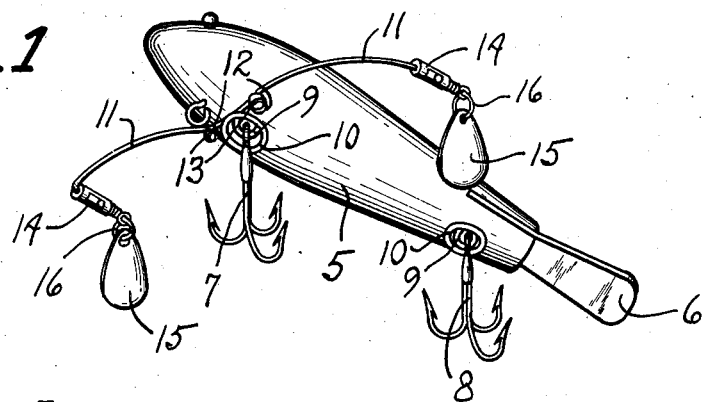
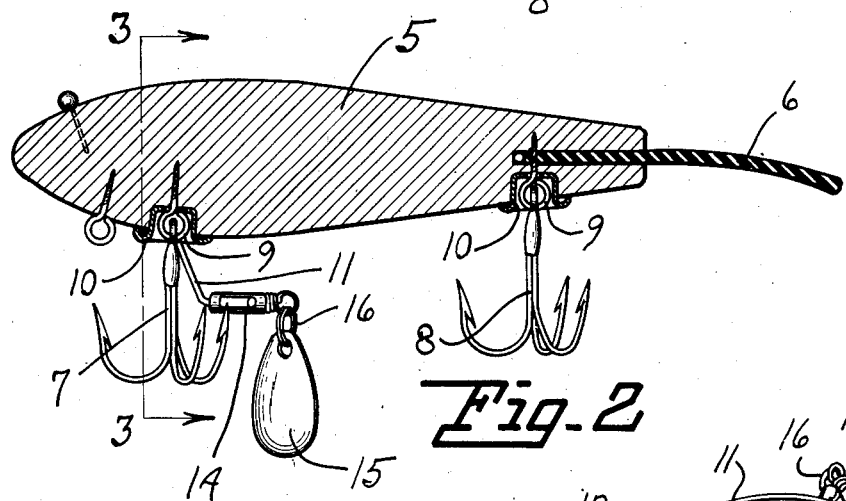
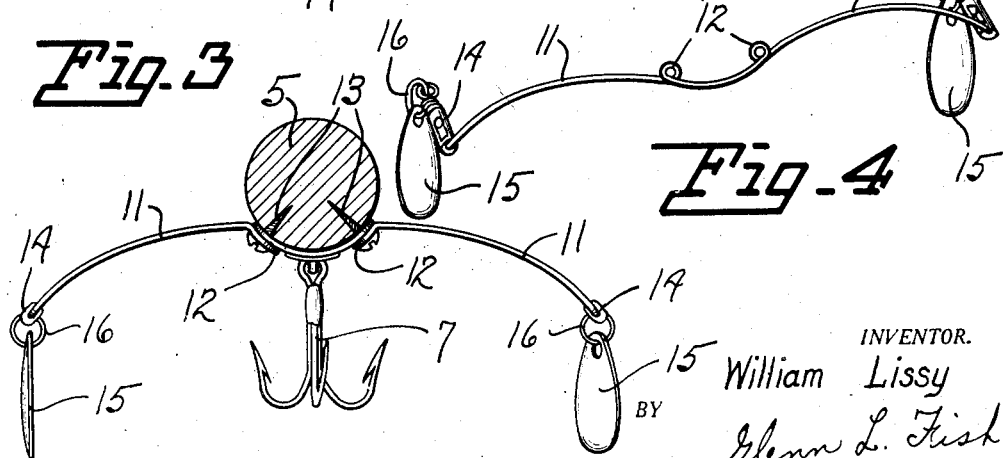
INVENTOR.
William Lissy
BY Glenn L. Fish
ATTORNEY.

Patented Feb. 27, 1934

1,948,823

UNITED STATES PATENT OFFICE 1,948,823

FISH LURE

William Lissy, Spokane, Wash.

Application May 18, 1931. Serial No. 538,164

1 Claim. (Cl. 43—46)

My invention relates to fish lures and more particularly to a fish lure body having extended spring wire side arms with a spoon connected to the ends of said arms by means of swivels. Certain objects of the invention are to provide spring wire arms for the device so formed and arranged with spoon and swivel connections that a complex movement is imparted to the spoons when the device is towed through water for the purpose of attracting fish and alluring them to hooks suspended from the body of the device. Further objects are to make the device more enticing by curving the spring arms downward and thus bringing the swiveled spoons on a level with the suspended hooks whereby fish will be more effectively decoyed to the hooks.

In the drawing:

Figure 1 is a view in perspective of a fish lure with my improved spring swivel arms connected thereto;

Fig. 2 is a view in central longitudinal vertical section of the same;

Fig. 3 is a view in transverse vertical section taken substantially on a broken line 3, 3 of Fig. 2; and Fig. 4 is a detail view in perspective of the spring extension arms with a spoon connected to either end thereof by means of a swivel.

Referring to the drawing throughout which like reference numerals indicate like parts, the numeral 5 designates a body that is usually made of wood somewhat in the form of a fish and said body has a rubber tail 6 that may be connected to the rear reduced end of the body in any desired manner. The numerals 7 and 8 respectively designate forward and rear grapnel or cluster fish hook members that may be pivotally suspended from screw eyes 9 set in socket members 10 secured to the underside of said body.

The novelty of my invention resides principally in a pair of arms 11 that are preferably made of spring wire. Said arms are made of a single piece of wire that is provided with a pair of spaced apart loops 12 at its central portion and is securely fastened to the underside of the body 5, and preferably to the forward end portion thereof, by means of screws 13 passing through said loops. Said arms extend transversely of said body at equal lengths on either side thereof and are bowed or curved downwardly as most clearly shown in Fig. 3 of the drawing.

Both outer end portions of the spring wire arms 11 are bent rearwardly and a swivel 14 is fixedly secured to each bent end of said arms. The rotary eye member of each swivel is connected to a spoon 15 by means of a link 16 passing loosely through said rotary eye member and through a hole in the spoon.

When the device as a whole is towed through the water the spring arms 11 will be given a springy or jerky movement which will be imparted to the spoons 15 in addition to the rotary movement imparted by the swivels 14 and the swishing movement of the spoons caused by their particular contour or shape. The spoons will therefore have a very complex movement while at the same time the spring arms will tend to stabilize the movement of the body 5 through the water. The downward curve of said arms places the spoons substantially on a level with the fish hooks 7 and 8 and the aforesaid complex movement of said spoons is calculated to be particularly alluring in attracting fish to the hooks.

I claim:

A fish lure comprising a body, resilient arms fixed to the forward portion of the body and spoons carried by the resilient arms said body having two cluster fish hook members each comprising a plurality of fish hooks joined together. one of said cluster members being pivotally suspended from the forward under portion of the body, and the other cluster member being pivotally suspended from the rear under portion of the body, and the spoons being disposed between the cluster hook members on each side of the body whereby they serve to lure fish to either or both of the cluster hook members.

WILLIAM LISSY.